Figure 1:
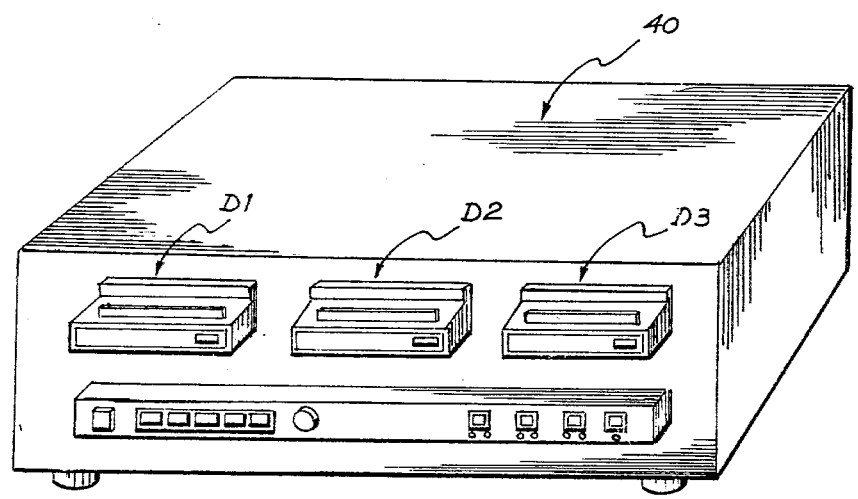

United States Patent [19]

Smith et al.

[11] 4,262,314

[45] Apr. 14, 1981

[54] AUTOMATIC MULTIPLE TAPE PLAYER

[75] Inventors: Neil L. Smith, Crows Nest; Richard J. Walters, Gladesville, both of Australia

[73] Assignee: Bell & Howell Company, Chicago, Ill.

[21] Appl. No.: 26,512

[22] Filed: Apr. 3, 1979

[30] Foreign Application Priority Data

Apr. 6, 1978 [AU] Australia .............................. PD3927

[51] Int. Cl.³ ...................... G11B 15/68; G11B 23/04
[52] U.S. Cl. ......................................... 360/69; 360/92
[58] Field of Search ...................... 360/69, 92, 91, 90, 360/71, 72.2, 74.1, 74.4

[56] References Cited

U.S. PATENT DOCUMENTS

| | | | |
|---|---|---|---|
| 3,126,162 | 3/1964 | MacKenzie | 360/69 |
| 3,247,328 | 4/1966 | Mitchell et al. | 360/92 |
| 3,359,007 | 12/1967 | Perreau | 360/92 |
| 3,703,251 | 11/1972 | Suzuki | 360/92 |
| 3,756,487 | 9/1973 | Pechi | 360/92 |
| 3,800,313 | 3/1974 | Karklys | 360/69 |
| 3,896,490 | 7/1975 | Rose et al. | 360/69 |

*Primary Examiner*—Alfred H. Eddleman
*Attorney, Agent, or Firm*—Robert J. Schneider; Roger M. Fitz-Gerald

[57] ABSTRACT

Apparatus for sequential cyclic operation of a plurality of magnetic tape playing devices. A single side of each tape in each device is played one after the other until all the devices have been operated. Then the other side of the tape is sequentially played. The operation of the device is controlled by logic circuitry responsive to an end-of-tape sensor to operate the next device, switch the tape drive mechanism of the device just operated to play the other side of the tape when activated, and finally to switch off the previously played device. A trouble indicator responsive to the failure of the drive mechanism to be switched from one way of operation to the next is also disclosed.

9 Claims, 2 Drawing Figures

AUTOMATIC MULTIPLE TAPE PLAYER

The present invention relates to a circuit arrangement for the sequential cyclic operation of a plurality of signal recording devices such as magnetic tape cassette drives.

The present invention finds application in the supply of background music, for example, from pre-recorded tapes over extended periods of time. The present invention finds particular application in the supply of background music to restaurants, dental and medical surgeries, offices, waiting rooms, and the like.

It is known in automotive use, for example, to have a magnetic tape casset which is playable in a tape deck mechanism which has an automatically switchable two-way drive mechanism so that one side of the tape is fully played and then the drive mechanism is switched to rotate in the other direction thereby fully playing the other side of the tape. This process is indefinitely repeatable without any action on behalf of the listener. However, the total playing time before a repeat of the music (or other signal) recorded on the tape is limited to the total playing time of the single cassette.

It is known to have other apparatus of this type for use in supplying background music. However, the problem of the abovedescribed short playing time before repetition occurs has, in these prior art devices, been overcome by making a single tape of very long duration. For example, a single tape may be provided to play for eight hours or twenty four hours. However, such apparatus is relatively expensive and is inflexible in that the long period of music must be played from beginning to end before a change in the music can be put into effect.

It is the object of the present invention to provide a circuit arrangement which permits the sequential cyclic operation of a plurality of signal recording devices, such as tape cassette decks, whereby the music of a number of different individual cassettes must be played before any repetition of the music recorded thereon take place.

According to one aspect of the present invention there is disclosed a circuit arrangement for the sequential cyclic operation of a plurality of signal recording devices each of which includes a switchable two-way drive mechanism, an output, and an end sensor to indicate the end of the signal recorded therein, said arrangement comprising power supply means, a power switch means for each said device, each power switch means connecting the corresponding device to said power supply means, and a logic circuit, wherein each end sensor is connected to said logic circuit, each power switch means is operable in turn by said logic circuit, and each said switchable two-way drive mechnism is switchable by said logic circuit. Said logic circuit, on receipt of a signal from an end sensor that the end of the signal recorded in the corresponding one of said devices has been reached, switches on the power switch means of the next said drive, switches the drive mechanism of said one device from a first way of operation to its other, second, way of operation whereby a cycle of each said device sequentially operation in the first way followed by each said device sequentially operating in the second way, is continuously repeated.

Figure 2:
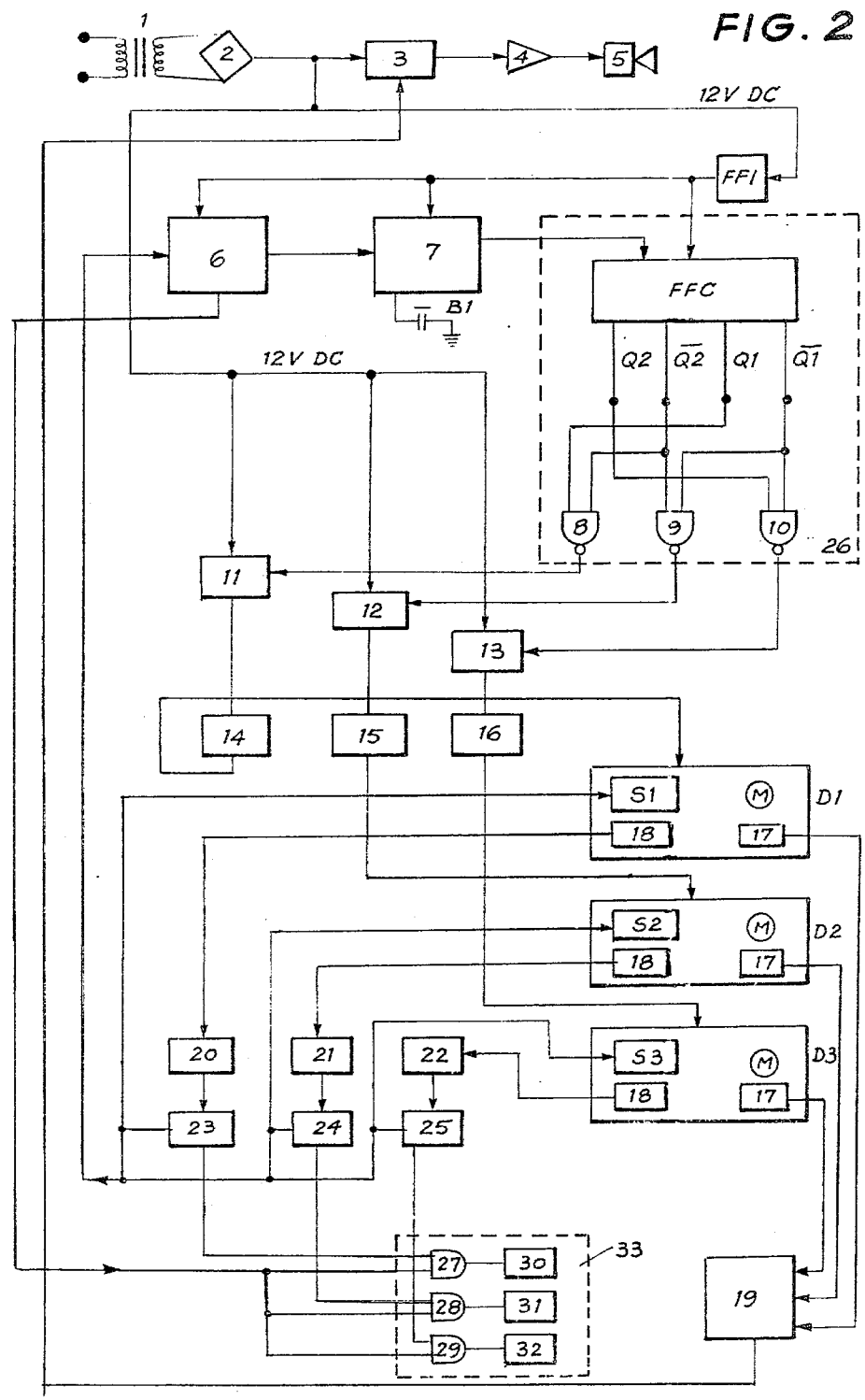

One embodiment of the present invention will now be described with reference to the drawings in which FIG. 1 is a schematic perspective view of the external appearance of the apparatus of the preferred incorporating the circuit arrangement of the preferred embodiment, and FIG. 2 is a schematic block diagram of the circuit arrangement of the preferred embodiment.

Referring now to FIG. 1, the apparatus of the preferred embodiment is contained in a housing 40 having three individual reversible tape cassette decks D1 to D3 inclusive mounted on the front panel thereon. Also mounted on the front panel of the housing 40 are control switches and indicator lights.

As seen in FIG. 2, the cassette decks D1 to D3 each comprise a motor M, solenoids S1 to S3 respectively, an audio pick-up head 17 and an end sensor 18. Such decks are standard items of equipment and are often installed in motor vehicles in which operation, at the end of playing of one side of the cassette inserted in a deck, the end sensor 18 operates the switching solenoid S1, for example, thereby operating the motor M is reverse and playing the other side of the cassette. This procedure is repeated continuously until stopped by the driver of the vehicle so that the audio pick-up head 17 produces a signal that corresponds to the music on the first side of the tape cassette and then the second side of the tape cassette and so on, this cycle being continuously repeated. Although of this general construction, the cassette decks D1 to D3 are not operated in this manner in the present invention.

The operation of the circuit arrangement of the preferred embodiment will not be described with reference to FIG. 2 in which a main transformer 1 is used to supply electric power to a rectifier/DC power supply 2 from an AC main supply (not illustrated). The supply 2 supplies power to an audio mixer 3 which in turn feeds a power amplifier 4 which supplies an audio signal to a loud speaker 5.

When the supply 2 is switched on, an initialising flip-flop FF1 supplying power to a pulse shaper 6, a skip switch circuit 7 and a flip-flop counter FFC. The output Q1 and Q2 of the flip-flop counter FFC is able to count from logical 00 to logical 11 and then cycle through this count again. The output of the flip-flop counter FFC and the complements thereof are connected to three NAND gates 8, 9 and 10, the outputs of which are respectively connected to power switches 11 to 13 inclusive. The flip-flop counter FFC and the NAND gates 8 to 10 together form a pulse recognition circuit 26.

The power switches 11 to 13 respectively convey the 12 V DC output of the supply 2 via mechanical normally closed isolation switches 14 to 16 respectively and thence to three tape cassette decks D1 to D3 respectively.

Each of the decks D1 to D3 has an audio pick-up head 17, the output of which is connected to a corresponding input of a corresponding audio equalizer pre-amplifier, all three of which are indicated by block 19, the audio output of which is connected to the audio mixer 3. In addition, each of the decks D1 to D3 has an end sensor 18 the output of which is connected to a respective one of three sensor switches 20 to 22 respectively. The sensor switches 20 to 22 each operate a respective one of three high current 23 to 25 respectively. The output of each of the high current switches 23 to 25 is connected to the corresponding solenoid S1 to S3 of the tape decks D1 to D3 respectively.

In addition, the outputs of the high current switches 23 to 25 are connected to the pulse shaper 6, the output of which is passed via skip switch circuit 7 to the flip-flop counter FFC. Another output of the pulse shaper 6 is passed to one respective input of three AND gates 27 to 29 respectively. The other input of the AND gates 27 to 29 is connected to the output of the corresponding high current switches 23 to 25. The output of each of the AND gates 27 to 29 is respectively connected to one of three red light indicators 30 to 32 respectively. The AND gates 27 to 29 and red light indicator 30 to 32 together comprise a red light warning circuit 33.

With each of the decks D1 to D3 loaded with a conventional tape cassette, when the power supply 2 is turned on, the initial value of flip-flop counter FFC set by initialising flip-flop FF1 is such that the output of NAND gate 8 turns power switch 11 on whilst both power switches 12 and 13 are switched off by their corresponding NAND gates 9 and 10 respectively.

In consequence, power is supplied from the supply 2 through switches 11 and 14 to the deck D1 which therefore plays one (first) side of the cassette tape inserted therein. Accordingly, the music recorded on the first side of that tape is transduced by audio pick-up head 17 and passed via the audio equalizer pre-amplifier 19, audio mixer 3 and power amplifier 4 to the loud speaker 5. When the end of the first side of the cassette loaded in deck D1 has been reached, the end sensor 18 of deck D1 is activated thereby sending a signal to sensor switch 20 which operates high current switch 23. The output of high current switch 23 is passed to solenoid S1 of deck D1 thereby reversing the drive mechanism powered by the motor M over in readiness for the other side of the tape cassette loaded in deck D1 to be played.

Simultaneously, the output of the only high current switch activated, namely switch 23, is passed to the pulse shaper 6 and thence to the skip switch circuit 7, the output of which increments the output of the flip-flop counter FFC. In consequence, the output of NAND gate 8 changes thereby turning power switch 11 off and preventing any further operation of the back D1.

At the same time, NAND gate 9 enables power switch 12 thereby supplying power to deck D2 and causing the first side of the tape cassette loaded therein to be operated.

When the end of the first side of the tape cassette in deck D2 has been reached, the abovedescribed procedure is repeated so that deck D2 is switched off after the solenoid S2 has been operated so as to set the drive mechanism for operation in the other direction and deck D3 is supplied with power. Again when the first side of the tape cassette inserted in deck D3 has been reached, the procedure is repeated, deck D3 being switched off and deck D1 being supplied with power. It will be apparent, however, that it is now the second side of the tape cassette mounted in deck D1 which is played until the end of this side is reached, and then the second side of the tape cassette inserted in deck D2 is played and so on. It will therefore be seen that a continuous cycle is achieved in which the first side of the tape cassettes mounted in decks D1 to D3 respectively are played, and then the second side of each of the tape cassettes is played, and so on.

A manual push button switch B1 is provided in association with the skip switch circuit 7 and operation of the switch B1 causes the output of the skip switch circuit 7 to change as if it had received a signal from the pulse shaper 6. As a result, the output of flip-flop counter FFC changes thereby causing the next deck in sequence to be supplied with power and the presently operated deck to be switched off.

The function of the red light warning circuit 33 is to provide a visual indication in the event of any deck malfunction. This is achieved by the output of pulse shaper 6 which is connected to AND gates 27 to 29 being shaped so as to provide a relatively long pulse of the order of, say, 0.5 seconds. If this long pulse is present at the same time as the output from one of the high current switches 23 to 25, the corresponding one of the red light indicators 30 to 32 is enabled thereby indicating, for example, that the switching of the corresponding solenoid S1 to S3 has not taken place because of some mechanical defect or cassette fault, in which event, the output of the end sensor 18 will still be present, It will be apparent from the foregoing that the particular arrangement of the preferred embodiment confers many advantages. In particular, the isolation switches 14 to 16 permit an individual one of the tape decks D1 to D3 to be isolated for repair or replacement whilst either one of the other two remaining tape decks is available for continuous play of music. In this way repairs may be effected without interrupting the continuous playing of music. Similarly, the tape cassette contained in any deck may be changed to provide for a spot announcement, for example, and that announcement can be made at will by the operator pressing the button B1 after having placed the spot announcement cassette in the next deck to be operated.

In the preferred embodiment, the red light indicator 30 to 32, the push button switch B1, the on/off switch for the power supply 2, and an indicating lamp (not illustrated) for each of the decks D1 to D3, are all mounted on the front panel of the housing 40. In addition, the circuit arrangement of the preferred embodiment has been realised using integrated circuits and therefore the housing 40 is of relatively small size. The particular realisation of the preferred embodiment required the following integrated circuits.

1 X 4538 Motorola
1 X 4081 National
4 X 4027 National
2 X 4011 National

The foregoing describes only one embodiment of the present invention and modifications, obvious to those skilled in the art, may be made thereto without departing from the scope of the present invention. For example, the recording devices need not be magnetic tape cassette devices but can also be other devices for reproducing recorded signals such as magnetic disc recording apparatus. Furthermore, the end sensor may be electronically triggered to indicate the absence of signal on a tape or mechanically triggered to indicate the end of the tape.

What is claimed is:

1. A circuit arrangement for the sequential cyclic operation of a plurality of signal recording devices, each of which includes a switchable two-way drive mechanism, an output and an end sensor to indicate the end of the signal recorded therein, said arrangement comprising power supply means, a power switch means for each said device, each power switch means connecting the corresponding device to said power supply means, and a logic circuit, wherein each end sensor is connected to said logic circuit, each power switch means is operable in turn by said logic circuit, and each said switchable two-way drive mechanism is switchable by said logic circuit, said logic circuit, on receipt of a signal from an end sensor that the end of the signal recorded in the corresponding one of said devices has been reached, switches on the power switch means of the next said device, switches off the power switch means of said one device, and switches the drive mechanism of said one device from a first way of operation to its other, second, way of operation whereby a cycle of each said device sequentially operating in the first way followed by each said device sequentially operating in the second way, is continuously repeated.

2. A circuit arrangement as claimed in claim 1 wherein said logic circuit includes a counter means, the logical output of said counter being connected to a plurality of logic gates, the output of said gates selectively enabling said power supply switches and the output of each end sensor incrementing said counter means.

3. A circuit arrangement as claimed in claim 2 including a manually operated switch to increment said counter means thereby causing operation of said next device before the end of the signal recorded in said one device has been reached.

4. A circuit arrangement as claimed in claim 1 wherein each said power switch means includes a manually operated isolation switch thereby permitting manual isolation of one device for servicing without interruption of another device.

5. A circuit arrangement as claimed in claim 1 wherein each said device comprises a tape cassette deck having a switchably reversible drive mechanism.

6. A circuit arrangement as claimed in claim 5 having three said tape cassette decks, said cycle comprising side one of all three tap cassettes followed by side two of all three tape cassettes.

7. A circuit arrangement as claimed in claim 6 mounted in a single housing, said three tape cassette decks being mounted adjacent one another on a front panel of said housing.

8. A circuit arrangement as claimed in claim 1 including a trouble means responsive to the failure of said drive mechanism to switch on command.

9. A circuit arrangement as claimed in claim 8 including a pulse generating means and a means for detecting the sustained presence of a pulse generated by said pulse generating means and the switching signal from said logic circuit to said drive mechanism.

* * * * *

UNITED STATES PATENT AND TRADEMARK OFFICE
CERTIFICATE OF CORRECTION

PATENT NO. : 4,262,314
DATED : April 14, 1981
INVENTOR(S) : Neil L. Smith and Richard J. Walters It is certified that error appears in the above-identified patent and that said Letters Patent are hereby corrected as shown below:

Column 1, line 15, correct spelling of "cassette";

Column 1, line 43, change "take" to --takes--;

Column 1, line 61, after "drive,", insert --switches off the power switch means of said one device, and--;

Column 1, line 64, change "operation" to --operating--;

Column 2, line 2, after "preferred", insert --embodiment--;

Column 2, line 31, change "not" to --now--;

Column 2, line 40, after "FF1", insert --is also supplied with power, the output of the initialising flip-flop FF1--;

Column 2, line 65, after "current", insert --switches--;

Column 3, line 41, change "back" to --deck--;

Column 3, line 44, after "12", insert a comma;

Column 4, line 1, change "shapter" to --shaper--;

Column 4, line 18, delete the comma and insert a period;

Column 4, line 25, change "play" to --playing--;

UNITED STATES PATENT AND TRADEMARK OFFICE
CERTIFICATE OF CORRECTION

PATENT NO. : 4,262,314
DATED : April 14, 1981
INVENTOR(S) : Neil L. Smith and Richard J. Walters It is certified that error appears in the above-identified patent and that said Letters Patent are hereby corrected as shown below:

Claim 6, line 3, change "tap" to --tape--; and

Claim 8, line 2, after "trouble", insert --indicating--.

Signed and Sealed this

Third Day of November 1981

[SEAL]

Attest:

GERALD J. MOSSINGHOFF

Attesting Officer       Commissioner of Patents and Trademarks